US006473768B1

(12) United States Patent
Srivastava et al.

(10) Patent No.: US 6,473,768 B1
(45) Date of Patent: Oct. 29, 2002

(54) SYSTEM AND METHOD FOR MODIFYING AN EXECUTING APPLICATION

(75) Inventors: Aditya Srivastava, Plano, TX (US); Thomas Traughber, Austin, TX (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 08/965,461

(22) Filed: Nov. 6, 1997

Related U.S. Application Data

(60) Provisional application No. 60/030,523, filed on Nov. 12, 1996.

(51) Int. Cl.[7] .............................................. G06F 17/30
(52) U.S. Cl. ..................... 707/103; 707/100; 707/101; 707/10
(58) Field of Search .................... 707/103, 100, 707/104, 10, 101; 395/701, 704; 709/217, 203, 219

(56) References Cited

U.S. PATENT DOCUMENTS

| | | | | |
|---|---|---|---|---|
| 5,699,310 A | * | 12/1997 | Garloff et al. | 395/701 |
| 5,752,029 A | * | 5/1998 | Wissner | 707/104 |
| 5,758,160 A | * | 5/1998 | McInerney et al. | 395/170 |
| 5,812,850 A | * | 9/1998 | Wimble | 395/704 |
| 5,815,718 A | * | 9/1998 | Tock | 395/705 |
| 5,826,025 A | * | 10/1998 | Gramlich | 709/217 |
| 5,842,020 A | * | 11/1998 | Faustini | 395/701 |
| 5,848,274 A | * | 12/1998 | Hamby et al. | 395/704 |
| 5,911,071 A | * | 6/1999 | Jordan | 395/701 |

\* cited by examiner

*Primary Examiner*—Greta L Robinson
(74) *Attorney, Agent, or Firm*—Baker Botts L.L.P.

(57) ABSTRACT

A method of component assembly based on an engine inserted into code of an application that causes the application to be modified by tools while the application is running. The method can be used with a Java component where the applet byte-code contain a modifier engine and interfaces that launch tools to allow the modifications.

38 Claims, 3 Drawing Sheets

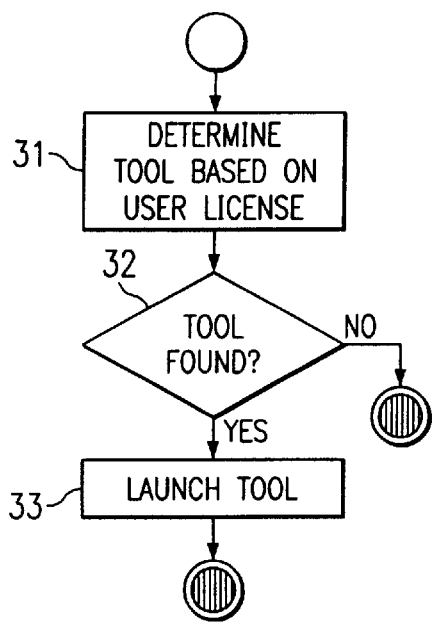
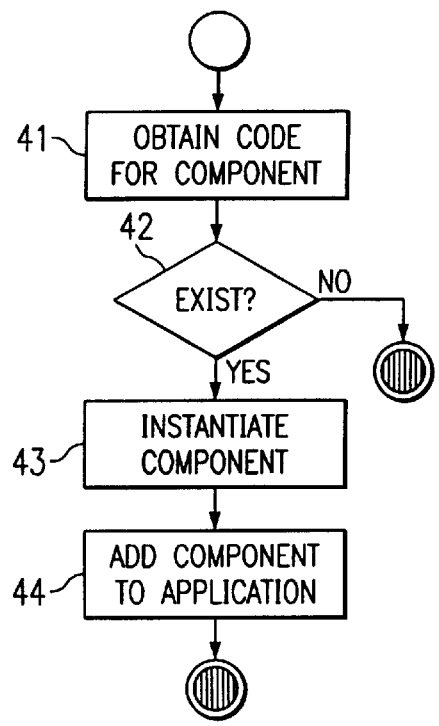
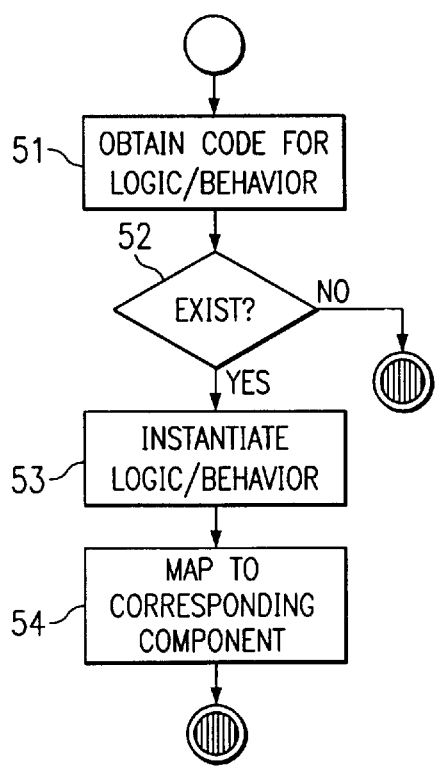
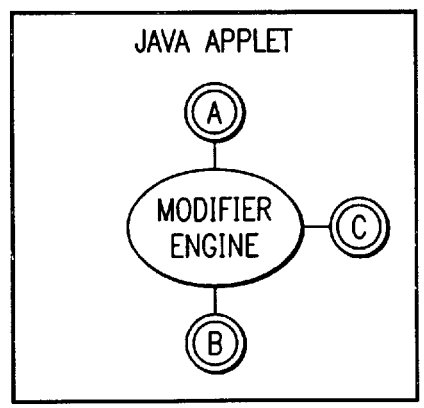

SYSTEM AND METHOD FOR MODIFYING AN EXECUTING APPLICATION

CROSS REFERENCE TO RELATED APPLICATIONS

This application claims priority under 35 USC § 119 of provisional application number 60/030,523 filed Nov. 12, 1996.

TECHNICAL FIELD OF THE INVENTION

This invention relates to software tools for creating and modifying software applications, and is particularly applicable to creating and modifying Web applications such as those with Java applets and applications.

BACKGROUND OF THE INVENTION

The Internet is a large network that connects many thousands of computers together. It is a heterogeneous network because many different types of computers are connected. The computers all use the TCP/IP protocol to communicate. This means that a PC can communicate just as easily with a MAC as well as another PC. There are lots of different applications on the Internet. One of the most widely used is the World Wide Web WWW). This application consists of two parts, a web browser and a web server. The web browser typically runs on a desktop computer, such as a PC or MAC. The web server typically runs on a server computer, such as an HP or IBM mainframe. Today, the primary purpose of this application is to transmit web pages from the web server to the web browser. Today there are tens of thousands of networks connected to the Internet with millions of host computers and tens of millions of users world wide accessing tens of millions of web pages. The WWW can also be used to execute applications inside these web pages. When a web page is received by a web browser and an application is referenced or contained in the web page, the web browser will execute that application.

Intranets are internal company networks that utilize the technologies of the Internet. These networks are maintained by the company in which they are contained. Companies will either maintain these networks directly or outsource the maintenance to service providers.

Extranets are networks created between companies. These networks are private to the connected companies. These networks are maintained by one or more of the connecting companies or by an outside service provider.

Applications in web pages work well when created with a new Java programming language from Sun Microsystems that was introduced in 1995. Java is a programming language for Internet/Intranet/Extranet applications and particularly for the World Wide Web application. Java is an object-oriented programming language. With the exception of simple types like numbers and booleans, most things in Java are objects. However, even those simple types have object wrappers. Java code is organized into classes where each class defines a set of methods that form the behavior of an object. A class can inherit behaviors from another class. Java source programs are compiled into files which contain byte-code representations of the program. Byte-codes are similar to machine instructions so that the Java programs will be very efficient. Byte-codes are not specific to a particular machine so programs can execute in lots of different computers without re-compiling the program. In a Java byte-code file, all references to classes, methods and variables are made by name and are resolved when the code is first executed. The Java byte-codes are executed by a Java Virtual Machine. The Java Virtual Machine normalizes the computer-specific operations for the byte-codes. Because there are so many computer systems connected to each other, there is a need for a language that is not tied to a specific platform to exchange programs. Java is ideal for this purpose. The Java programs are transmitted as byte-codes, which means that they can run on any computer without having to be compiled. It is possible to download a Java program into any computer on the Internet/Intranet/Extranet and execute it without worrying about the system in which the program was developed.

Applications referenced in a web page and written in the Java programming language are called Java applets. The web browser contains the Java Virtual Machine. When the user accesses these pages, the applets are downloaded to their computers and handed to the Java Virtual Machine to execute. Many web browsers contain the Java Virtual Machine. Sun Microsystems provides one such browser called Hot Java. Netscape provides another browser called Navigator. Microsoft provides another browser called Internet Explorer. All contain the Java Virtual Machine and can execute Java applets.

Java can also be used to create traditional applications. Applications such as Microsoft Word, Corel Wordperfect and company client/server applications could be created with Java. Many companies have announced plans to include the Java Virtual Machine in PCs, MACs, mainframes and other computers. Applications written in Java will be able to execute on these computers just as traditional applications can run on PCs, MACs and mainframes today.

Java can also be used to create embedded applications. Applications such as those found in cellular phones, televisions, and other devices could be created with Java. Many companies have announced plans to include the Java Virtual Machine in devices.

Many software tools exist today that can create Java applets and applications. These tools read Java source programs, create information data bases about the programs and generate Java byte-odes. Some even allow the Java byte-codes to be modified while they are executing, provided the execution is being done inside the tool. They perform these changes by referring to their information data bases and patching the byte-codes with the changed information. One of the drawbacks to this method is the requirement to always keep the Java source programs and the information data bases available and make the changes in the tool. Many times the information data bases are quite large and require extra disk storage to make them available. Furthermore, there are additional steps required to synchronize and track the Java byte-codes with the Java source programs and information data bases to ensure the Java byte-codes can be maintained.

These software tools are similar to tools for other languages, such as Visual Basic, C++ and COBOL. It is highly desirable to provide a capability that can eliminate the drawbacks of traditional software tools to help reduce the development cycle time and increase the maintainability of the executing applications.

SUMMARY OF THE INVENTION

In accordance with one embodiment of the present invention, there is described an engine in an application which gives users/developers of the application the ability to modify the application while the application is running.

These and other features of the invention that will be apparent to those skilled in the art from the following

DESCRIPTION OF THE DRAWINGS

FIG. 5 is a flow chart of a tool launch program;

FIG. 6 is a flow chart of a component installation program;

FIG. 7 is a flow chart of a logic installation program;

FIG. 8 illustrates a Java applet with modifier engine;

DETAILED DESCRIPTION OF ONE PREFERRED EMBODIMENT OF THE PRESENT INVENTION

Figure 1:
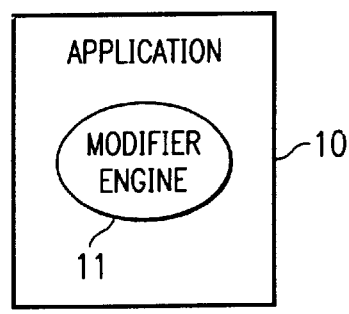
FIG. 1 illustrates a modifiable application architecture in accordance with one embodiment of the present invention.

The basic concept centers around what is called herein as a modifier engine, which is code inserted into an application and causes the application to be modified by tools while the application is executing. FIG. 1 shows the architecture of the application 10 with the modifier engine 11. Examples of these applications could be Java applets. In a Java applet, the modifier engine 11 is part of the byte-code.

Figure 2:
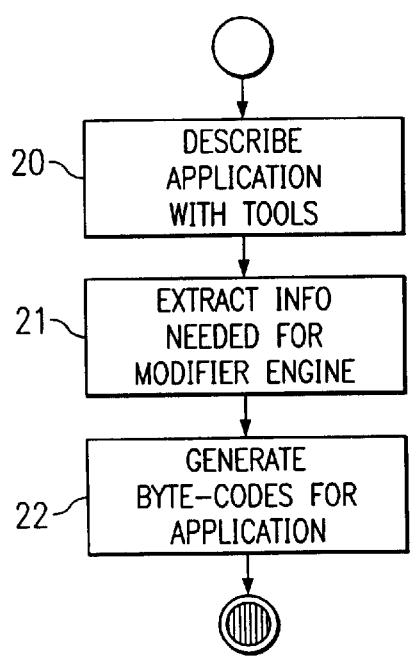
FIG. 2 is a flow chart that illustrates inserting a modifier engine in a new application.
Figure 3:
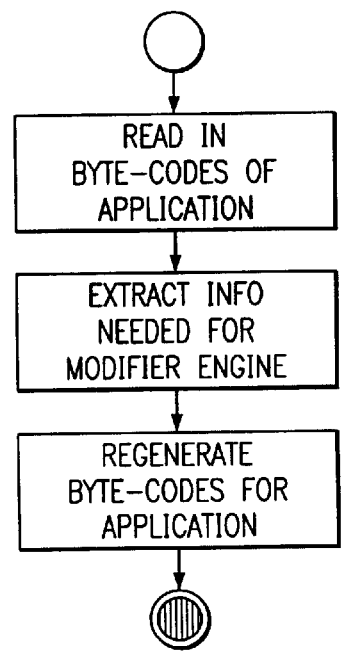
FIG. 3 is a flow chart that illustrates inserting modifier engine in an existing application.

Software tools are used to insert the modifier engine 11 into the application 10. There are essentially two types of tools used to perform the insertion. The first type of tool is used to create new applications. FIG. 2 shows the steps used by the first type of this tool. The tools are used to describe the application (Step 20) and to extract the information needed for the modifier engine (Step 21). Examples of these tools would be graphical user interface editors, visual logic editors, and data base connectivity editors. Once these tools describe the application, a code generation tool (Step 22) generates the application with the modifier engine. The second type of tool is used to modify an existing application to insert the modifier engine. FIG. 3 shows the steps used by these tools. These tools will examine the application looking for information required of the modifier engine and then re-generate the application with the modifier engine inside. These tools will read in byte-codes of an application (Step 31), extract information needed for the modifier engine (Step 32) and regenerate byte-codes for the application (Step 33).

In addition to being applicable to applications, the modifier engine is applicable to software tools. Software tools can also be viewed as an application. By having the modifier engine in the software tools, the tools can obtain the same benefits of reduction of development cycle time and increase in maintainability of the tools.

The modifier engine has the following capabilities.

Launch a set of tools while the application is executing. Examples of tools are palettes, property editors, catalogs, and logic editors.

Add and delete components of the application while the application is executing. The addition or deletion can be triggered by the application or the launched tools.

Add and delete behavior of the application while the application is executing. The addition or deletion can be triggered by the application or the launched tools.

Control access to the launch of tools, along with addition and deletion of the components and behavior.

Figure 4:
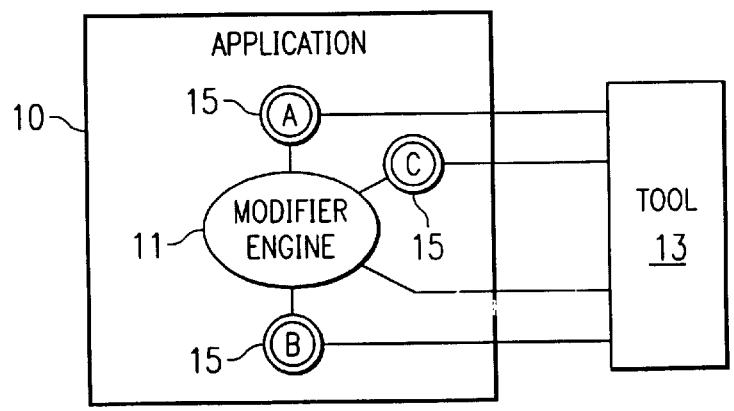
FIG. 4 is an example of modifiable application with a tool.

To enable these capabilities, the modifier engine 11 keeps track of the components used within the application. The tools query back into the modifier engine 11 to locate a component and then work directly through an interface to manipulate the component. FIG. 4 shows an example application that contains the modifier engine 11 and three components A, B, and C. The figure also shows a tool 13 that knows about the modifier engine. The tool 13 uses the modifier engine 11 to locate the application 10 and then uses interfaces 15 (represented by the area outside the dark circle) on the application to manipulate the components of interest. The interfaces "wrap" the component (A, B, or C) and provide the interaction protocol between the tool 13 and component (A, B, or C), as well as between the modifier engine 11 and component (A, B, or C).

The component interfaces 1.5 expose methods for querying meta-information about the component. Such methods might answer the questions, "What are your properties?", "What is the type name for this property?", "What are your events?", "What code should be used to initialize yourself?", etc.

Various tools 13 utilize the modifier engine 11 and component interfaces 15. For example, there is a palette tool that is used to select components to add to the application; there is a property editor to change the property values of a component; there is an event editor to create logic for an event handler of a component; there is an auto-componentizer that will automatically generate the component interfaces for an application part that doesn't have the interfaces; there is a wizard builder for creating a custom wizard for the application; etc.

There are several important programs for implementing the modifier engine 11. The first is shown by the flow chart in FIG. 5. Upon a pre-configured event (such as a combination of key and mouse presses), the modifier engine 11 will determine the appropriate customization tool(s) (Step 31) and then launch it (Step 33). For example, the modifier engine may launch a toolbar that contains a set of tools. Or, the modifier engine 11 may launch a customization wizard that steps the user through the possible customizations. Or further still, the modifier engine 11 may launch a property editor that only changes specified properties.

A second program is shown by the flow chart of FIG. 6. This program is also invoked upon a pre-configured event (such as a mouse drag) or invoked upon request from a tool. The modifier engine 11 will instantiate a component (Step 43) and add it to the set of components for the application (Step 44). For example, a palette tool might invoke the modifier engine 11 to instantiate a specific visual component. Once instantiated, the modifier engine 11 will appropriately add the component to the application (if the component were visual, adding might cause the component to be rendered).

A third program is shown by the flowchart of FIG. 7. This program is invoked upon request from a tool. The modifier engine 11 will instantiate a code fragment (Step 53) and map it to the appropriate component (Step 54) to exhibit behavior for that component. For example, a visual logic tool might generate the code for the event behavior of a component (Step 51) and proceed to invoke the modifier engine with that code. The modifier engine would instantiate the code (Step 53) and map it to the appropriate component (Step 54). Thus, when the event is triggered the behavior is dispatched and executed.

To facilitate the above three programs the components must support interfaces for the modifier engine and the tools. An example interface in Java is as follows;

```
public interface ComponentInterface {
public String constructionCode(ComponentDesc w);
public String initCode(ComponentDesc w);
public String initCodeWS(ComponentDesc w);
public void initValue(Frame f, ComponentDesc w);
};
```

List A

There are several key differences of this concept versus other concepts. There are concepts that incrementally compile the code to give the illusion of dynamic changes to look and behavior. However, these applications utilize an external database of information about the code, rather than utilize the information contained in the code to determine the changes. Furthermore, the goal is to leverage as much information within the code before adding the information to the code. Another key difference is other concepts require the code sources or information database to be brought into a tool. This concept has the tool launched from the executable code while it is running.

The differentiators allow ubiquitous access to tools for customizing applications, since the tools are essentially embedded with each application. Such access promotes more reuse of components since the components are easily customizable if they can't be used as is. Such reuse helps to reduce development cycle time. The architecture also provides better consistency between the applications, the tools and the meta-information to support the tools, because they are all bound together. Such consistency reduces errors in execution and deployment of the applications. Also, flexibility in evolving the meta-information is increased, because the model of the meta-information is kept within the application. The increased flexibility helps tools builders to better manage change in the model and thus, reduce their development costs.

This section discloses one embodiment of the method/system using Java. One skilled in the art could envision other application use in Java or any other language.

Figure 9:
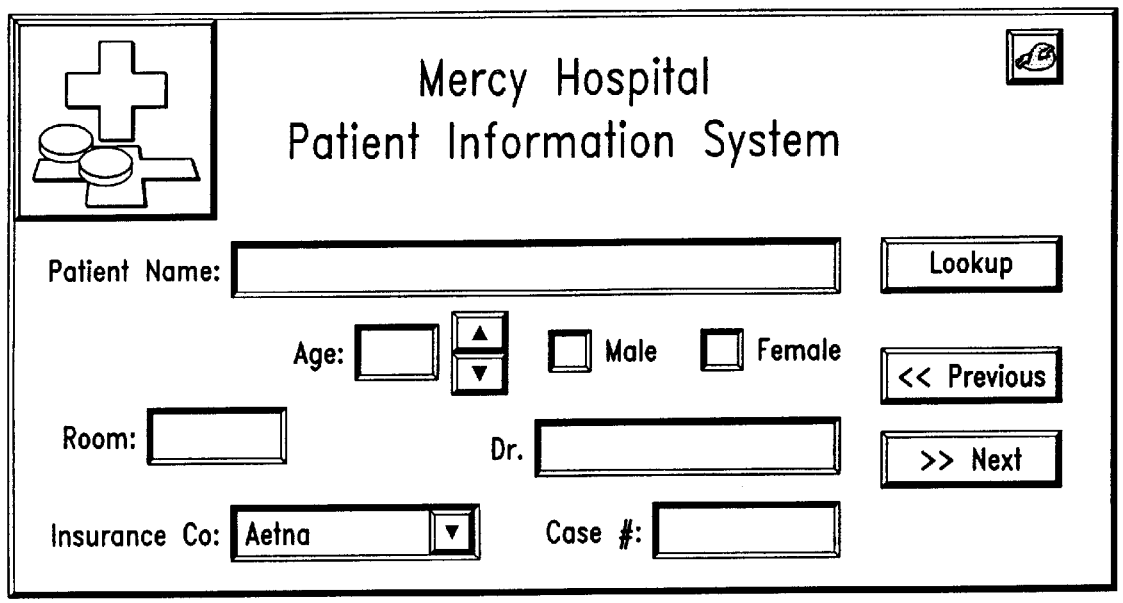
FIG. 9 illustrates a user interface for Java applet.

FIG. 8 shows the architecture of a Java applet with the modifier engine. The modifier engine is written in Java. Thus, the algorithms previously mentioned would be written in Java. Assume the Java applet was built with a set of tools that inserted the modifier engine into the applet. FIG. 9 shows an example user interface for a Java applet. Thus, one can see within FIG. 9 examples. of components A, B and C (FIG. 8); there's the various labels, such as "Mercy Hospital", "Patient Information System", "Patient Name:" and "Lookup"; there's also check boxes such as those labeled "Male" and "Female"; and there's the list box that has the value of "Aetna". There are also hidden components within the Java applet, such as the patient information class that represents the persistent information that will be displayed in the fields.

There are several techniques in Java to insert the modifier engine in an application. The Listing B shows one such technique. This technique says the modifier engine is a Java interface. The interface is implemented for applets as a ModifiableApplet. The ModifiableApplet contains the real applet, which turns out to be an instance of PatientinfoApplet. The applet exposed to the public is derived from ModifiableApplet and delegates all its functions to the real applet. One skilled in the art could envision other techniques for inserting the modifier engine.

```
public interface Modifier
public void startTools( );
public Object addComponent(String compClassName);
public void removeComponent (String compClassName);
public void addBehavior(String methName, String code);
public void reynoveBehavior(String methName);
}
public class ModifiableApplet extends Applet implements Modifier {
static final int MODIFIABLE = 1;
static final int APPLET = 2;
static final int APPLICATION = 4;
protected LicenseManager licenser;
protected Tool tool;
protected Applet realApplet;
protected Hashtable methods;
public void ModifiableApplet(Applet a, LicenseManager 1)
{ realApplet = a; licenser = 1; }
public void startTools( )
{/* performs algorithm in Fig. 5 */}
public Object addComponent (String compClassNaine)
{/* performs algorithm in Fig. 6 */}
public void removeComponent (String compClassName)
{,* performs inverse of addComponent( ) */}
public void addBehavior(String methName, String code)
{/* performs algorithm in Fig. 7 */}
public void removeBehavior(String methName)
{/* performs inverse of addBehavior( ) */}
}
public class PatientInfoApplet extends Applet {
/* code generated to display panel in Fig. 9 */
}
public class PatientInfoSystem extends ModifiableApplet {
public void PatientInfoSystem( )
{ super(new patientinfoApplet, new
PatientInfoLicenser); }
public void init( ) {
setLayout(new BorderLayout( ));
add("Center",__realApplet);
realApplet.init ( );
resize (__realApplet.width,__realApplet.height);
}
public boolean mouseDown(Event e,int x, int y) {
if (e.controlDown( )) {
startTools ( );
}
return true;
}
return realApplet.mouseDown( );
// Iinplement rest of Applet functions by delegating to
realApplet
}
```

List B: Example Java Modifier Engine Usage

For this example, the Java applet controls the invocation of the modifier engine when the user of the applet presses the control key in conjunction with the mouse button. When this event occurs, the algorithm identified in FIG. 5 is started. In the example code shown in List B, the event handler for that key-button combination (mouseDown( ) method of PatientlnfoSystem class) calls startTools( ) to instantiate the tools.

The implementation of startTools( ) can also be done with several techniques. List C shows one technique that utilizes. a license manager to obtain permission to invoke the tool. The license manager could be simple, such as letting everyone have access to one tool; or, it could be as complex as checking a user license code, looking up which tool matches that code, and sending payments to the originator of the applet. The tool would start on a separate thread and be informed of which modifiable object to operate on via the setTarget( ) method.

```
public void startTools( ) {
tool = licenser.newTool(this);
if (tool != null) tool.start( );
}
public interface LicenseManager {
public Tool newTool(Modifier object);
public boolean okayToAddcomponent( );
public boolean okayToAddBehavior( );
}
public interface Tool {
public void setTarget(Modifier object);
}
public class SimpleChange implements Tool, Runnable {
Modifier target;
public void setTarget(Modifier object) {
target = object;
// Rest of functions for tool
}
public class PatientInfoLicensor implements LicenseManager {
public Tool newTool(Modifier object) {
SimpleChange t = new SimpleChange( );
t.setTarget (object);
return t;
}
}
```

List C: Example Tool Launch Algorithm

The example shows there is only one tool supplied for the PatientInfoSystem. The tool, called SimpleChange, is instantiated when the control key is pressed in conjunction with the mouse button.

Once the tool is launched, the user may manipulate the tool in such a fashion as to cause the tool to add a new component to the applet. List D shows an example technique for component instantiation (FIG. 6).

```
public Object addComponent (String compClassName) {
if (licenser.okayToAddComponent( )) {
Class c = Class.forName(compClassName);
ComponentInterface o = c.newInstance( );
return o;
}
return null;
}
```

List D: Example Component Instantiation Algorithm

The example is fairly simple and makes some assumptions about the component being only a user interface component. However, one skilled in the art can expand the algorithm to understand the Java Reflection API to determine the type of component and provide separate storage for components that are not user interface components.

Another possible manipulation by the user of the tool is to change the behavior of the applet. For example, there may be some action tied to a button in the user interface. The tool might allow that action to change. To enable this capability, the tool would generate the necessary Java source code for the new action and then invoke the addBehavior method through the Modifier interface. One implementation of the addBehavior method is shown in List E.

```
public void addbehavior(String methaName, String code);
if (licenser.okayToAddBehavior( )) {
Class c = SpecialComplier.genBehavior(code);
MethodInterface m = c.newInstance( );
methods.put(methName, m);
}
}
public interface MethodInterface {
public Object invoke(Object o, Object [ ] args);
}
public boolean mouseDown(Event e, int x, int y) {
MethodInterface m =
(MethodInterface)methods.get("mouseDown");
args[0] = e; args[1] = x; args[2] = y;
Boolean b = (Boolean)m.invoke(realApplet, args);
return b.valueOf( );
}
```

List E: Example Logic Instantiation Algorithm

The example shows the use of a special compiler (named SpecialCompiler) to take Java source code from a tool and compile it into a class that supports the MethodInterface interface. This special compiler could be nothing more than a simple code generator to wrap the given source code as a class, invoke the Java compiler on that code and then instantiate the Class class for that code.

Once the class was returned from the special compiler, an object of the newly instantiate class would be created and added to a hash table for later retrieval. The mouseDown( ) method for a button is shown. It first finds the object supporting the MethodInterface interface and then proceeds to invoke the method contained in that object. This is a simple dispatching algorithm given the realApplet is constructed to support the dispatching. The construction implies all methods of realApplet that can be modified will include the simple dispatching algorithm shown in List E.

Figure 10:
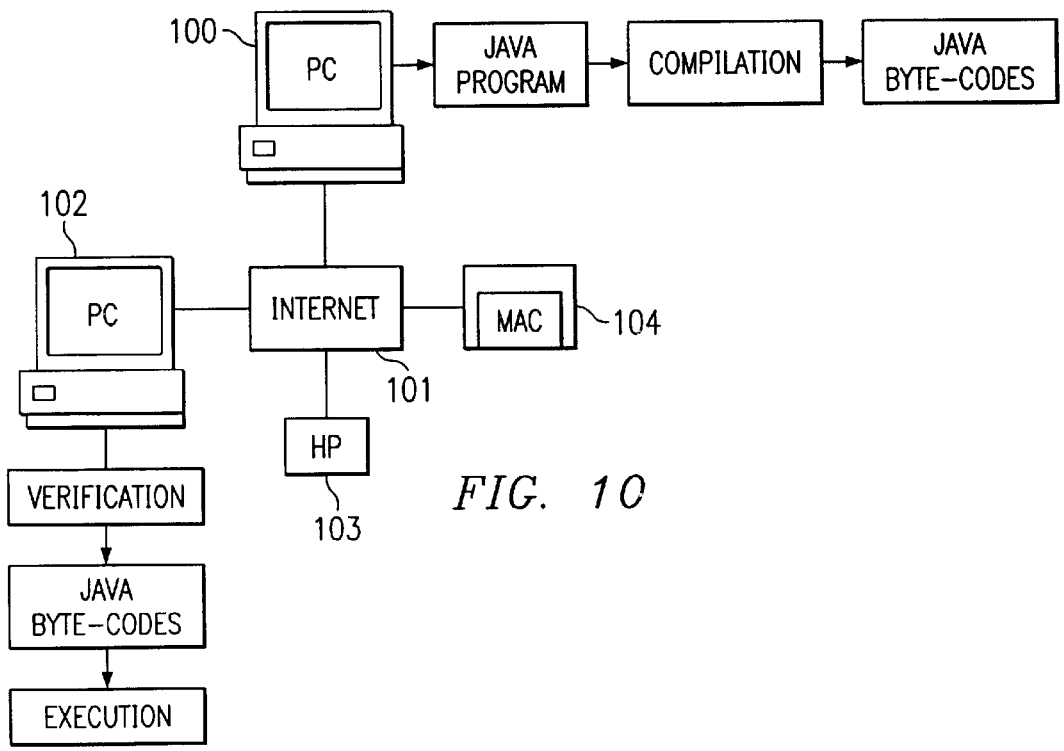
FIG. 10 illustrates a system using the present invention.

Referring to FIG. 10, there is illustrated an example of a system using Java where the source PC 100 is used to generate the application program, add the modifier engine and convert the program into Java byte-codes. Users can access the Java byte-codes from the source PC 100 via the Internet 101 through a web browser running on the user's computer, such as a PC 102, HP workstation 103 or MAC 104. Once retrieved, the Java byte-codes are executed and the user, if permitted, has the option to launch the tools and do the modification while the program is executing.

OTHER EMBODIMENTS:

Although the present invention and its advantages have been described in detail, it should be understood that various changes, substitutions and alterations can be made herein without departing from the spirit and scope of the invention as defined by the appended claims.

What is claimed is:

1. An apparatus for modifying an executing application executing in a processor, comprising:
    a modifier engine in an executing application that initiates launching of a set of tools and operable to use information contained in said executing application rather than an external database of information about said executing application to determine changes to said executing application; and
    said modifier engine being further operable to dynamically change parts of said executing application to include the changes in response to said tools while said executing application is running.

2. An apparatus for modifying an executing application executing on a processor comprising:
a code generator operable to generate and provide a modifier engine in an executing application, said modifier engine initiating launching of a set of tools; and
said modifier engine being further operable to dynamically change parts of said executing application to include changes using information contained in said executing application rather than an external database of information about said executing application to determine the changes to said executing application in response to said tools while said executing application is executing, to instantiate a component, and add said executing component to said application while said application is executing.

3. An apparatus for modifying an executing application executing on a processor comprising:
a code generator operable to generate and provide a modifier engine in an executing application including a component, said modifier engine initiating launching of a set of tools; and
said modifier engine operable to dynamically change parts of said executing application to include changes using information contained in said executing application rather than an external database of information about said executing application to determine the changes to said executing application with said modifier engine in response to said tools while said application is executing, and add a behavior to said component while said executing application is executing.

4. A tool operating on a first processor for providing an modifiable application whereby an application can be modified while said application is executing on second processor comprising:
a code generator operable to generate a modifier engine, the modifier engine operable to use information contained in said application rather than an external database of information about said application to determine changes to said application; and
a modifier engine insertor operable to insert said modifier engine in said application.

5. The tool of claim 4 and further comprising:
a set of tools operable to dynamically change parts of said application; and
said modifier engine being further operable to launch said set of tools on said second processor and being coupled to said application to allow dynamic changes to said application when running on said second processor.

6. The tool of claim 4, wherein said second processor is further operable to instantiate a component in said application and add it to said application.

7. The tool of claim 4, wherein said processor is further operable to add a behavior to a component in said application.

8. An apparatus for modifying an executing application comprising:
computer readable storage;
a modifier engine stored on said computer readable storage, said modifier engine operable in an executing application to:
launch a set of tools;
use information contained in said application rather than an external database of information about said application to determine changes to said application; and
dynamically change parts of said executing application to include the changes in response to the tools while the executing application is running.

9. The apparatus of claim 8, wherein said modifier engine is further operable to dynamically change parts of said executing application free of external information about said executing application.

10. An apparatus for modifying an executing application comprising:
computer readable storage;
a modifier engine stored on said computer readable storage, said modifier engine operable in an executing application to:
use information contained in said executing application rather than an external database of information about said executing application to determine changes to said application;
modify said executing application to include the changes;
instantiate a component; and
add said component to said executing application while said executing application running.

11. The apparatus of claim 10, wherein said modifier engine is further operable to launch a set of tools that communicate back to the application and said component is instantiated by said tools.

12. The apparatus of claim 11, wherein said modifier engine is further operable to add a behavior to said component.

13. An apparatus for modifying an executing application comprising:
computer readable storage;
a modifier engine stored on said computer readable storage, said modifier engine operable in an executing application to:
use information contained in said executing application rather than an external database of information about said executing application to determine changes to said application;
modify said executing application to include the changes;
cause said executing application to be modified with a component; and
add a behavior to said component while said executing application running.

14. The apparatus of claim 13, wherein said modifier engine is further operable to launch a set of tools while the application is executing that communicate back to said executing application to dynamically change parts of said executing application while said executing application is running and add said behavior using said tools.

15. The apparatus of claim 14, wherein said modifier engine is further operable to instantiate a code fragment upon request from said tool and map said code fragment to said component to exhibit behavior for said component.

16. An apparatus for modifying an application comprising:
computer readable storage;
software stored on said computer readable storage, said software being operable to:
examine an executable version of an application;
generate a modified executable application based on the executable version of the application, the modified executable application having a modifier engine therein;
attach a tool to the modified executable application while the modified executable application is executing;

use information contained in said modified executable application rather than an external database of information about said modified executable application to determine changes to said modified executable application; and modify the modified executable application to include the changes while the modified executable application is executing using the tool.

17. The apparatus of claim 16, wherein said software is further operable to generate the modified executable application is free of access to external information associated with the executable version of the application.

18. The apparatus of claim 17, wherein the external information includes source code.

19. The apparatus of claim 16, wherein said software is further operable to:

add a component to the modified executable application while the modified executable application is executing; and add a behavior to the modified executable application while the modified executable application is executing.

20. A method for modifying an executing application comprising:

providing a modifier engine in an executing application that initiates launching of a set of tools;

launching a set of tools with the modifier engine;

using information contained in the executing application rather than an external database of information about the executing application to determine changes to the executing application; and dynamically changing parts of the executing application to include the changes with the modifier engine in response to the tools while the executing application is running.

21. The method of claim 20, wherein dynamically changing parts of the application further comprises dynamically changing parts of the application free of external information about the application.

22. A method for modifying an executing application comprising:

using information contained in said executing application rather than an external database of information about said executing application to determine changes to said executing application;

providing a modifier engine in said executing application that causes said application to be modified to include the changes;

instantiating a component using said modifier engine; and adding said component to said application while said application running.

23. The method of claim 22 including launching a set of tools that communicate back to the application and said instantiating step includes invoking from said tool.

24. The method of claim 23 including adding a behavior to said component.

25. A method for modifying an executing application comprising:

using information contained in said executing application rather than an external database of information about said executing application to determine changes to said executing application;

providing a modifier engine in said executing application to include the changes and including a component that causes said application to be modified; and adding a behavior to said component while said executing application running.

26. The method of claim 25 including launching a set of tools while the application is executing that communicate back to the application to dynamically change parts of the application while it is running and adding said behavior using said tools.

27. The method of claim 26 wherein said modifier engine will instantiate a code fragment upon request from a tool and map said code fragment to said component to exhibit behavior for that component.

28. An apparatus for modifying an executing application executing in a processor comprising:

a modifier engine in an executing application that initiates launching of a set of tools;

means for using information contained in said executing application rather than an external database of information about said executing application to determine changes to said executing application; and means for dynamically changing parts of said executing application to include the changes with said modifier engine in response to said tools while said executing application is running.

29. An apparatus for modifying an executing application executing on a processor comprising:

means for generating and providing a modifier engine in an executing application, said modifier engine initiating launching of a set of tools;

means for using information contained in said executing application rather than an external database of information about the application to determine changes to the application;

means for dynamically changing parts of said executing application to include the changes with said modifier engine in response to said tools while said executing application is executing, and means for instantiating a component using said modifier engine; and adding said component to said executing application while said executing application is executing.

30. An apparatus for modifying an executing application executing on a processor comprising:

means for generating and providing a modifier engine in an executing application including a component, said modifier engine initiating launching of a set of tools;

means for using information contained in said executing application rather than an external database of information about said executing application to determine changes to said executing application; and means for dynamically changing parts of said executing application to include the changes with said modifier engine in response to said tools while said executing application is executing, and means for adding a behavior to said component while said executing application is executing.

31. A tool operating on a first processor for providing an modifiable application whereby said application can be modified while said application is executing on second processor comprising:

means for generating a modifier engine;

means for using information contained in said application rather than an external database of information about said application to determine changes to said application; and means for inserting said modifier engine in said application, said modifier engine operable to include the changes in said application while said application is executing.

32. The tool of claim 31 including a set of tools to dynamically change parts of said application; and
   means for providing for said set of tools to be launched by said modifier engine in said second processor and coupled to said application to allow dynamic changes to said application when running on said second processor.

33. The tool of claim 31 including means for providing for instantiating of a component in said application by in said second processor and adding it to said application.

34. The tool of claim 31 including means for providing for adding a behavior to a component in said application by said second processor.

35. A method for modifying an application comprising:
   examining an executable version of an application;
   generating a modified executable application based on the executable version of the application, the modified executable application having a modifier engine therein;
   using information contained in the modified executable application rather than an external database of information about said modified executable application to determine changes to the modified executable application;
   attaching a tool to the modified executable application while the modified executable application is executing; and
   modifying the modified executable application to include the changes while the modified executable application is executing using the tool.

36. The method of claim 35, wherein generating the modified executable application is performed free of access to external information associated with the executable version of the application.

37. The method of claim 36, wherein the external information includes source code.

38. The method of claim 35, wherein modifying the modified executable application includes:
   adding a component to the modified executable application while the modified executable application is executing; and
   adding a behavior to the modified executable application while the modified executable application is executing.

* * * * *